Dec. 14, 1948.    G. W. MERRITT    2,456,209
CAR DUMPING APPARATUS
Filed Sept. 30, 1944    4 Sheets-Sheet 1
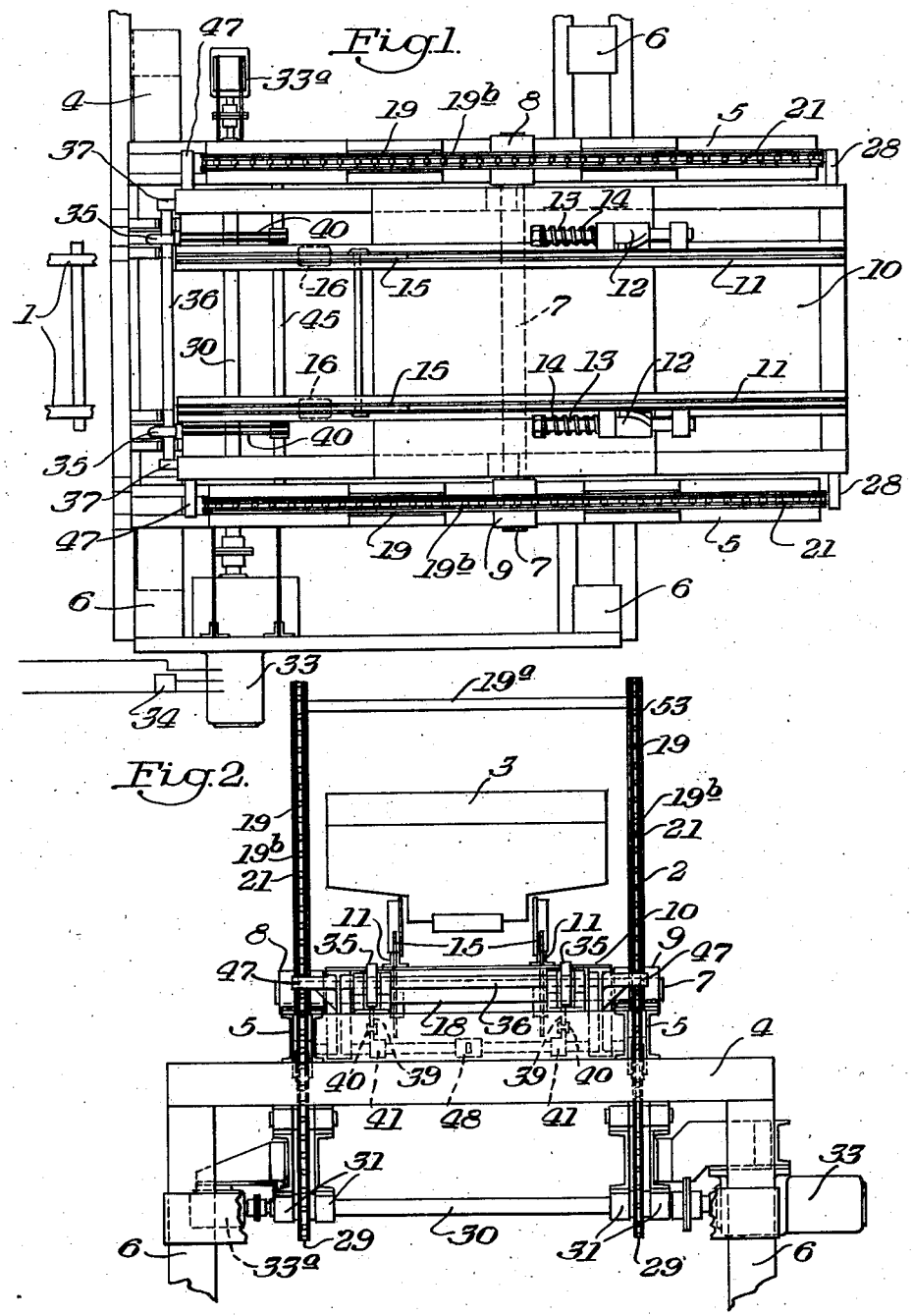
INVENTOR
Glenn W. Merritt.
BY
George J. Cruminger
ATTORNEY Dec. 14, 1948.  G. W. MERRITT  2,456,209
CAR DUMPING APPARATUS
Filed Sept. 30, 1944  4 Sheets-Sheet 2
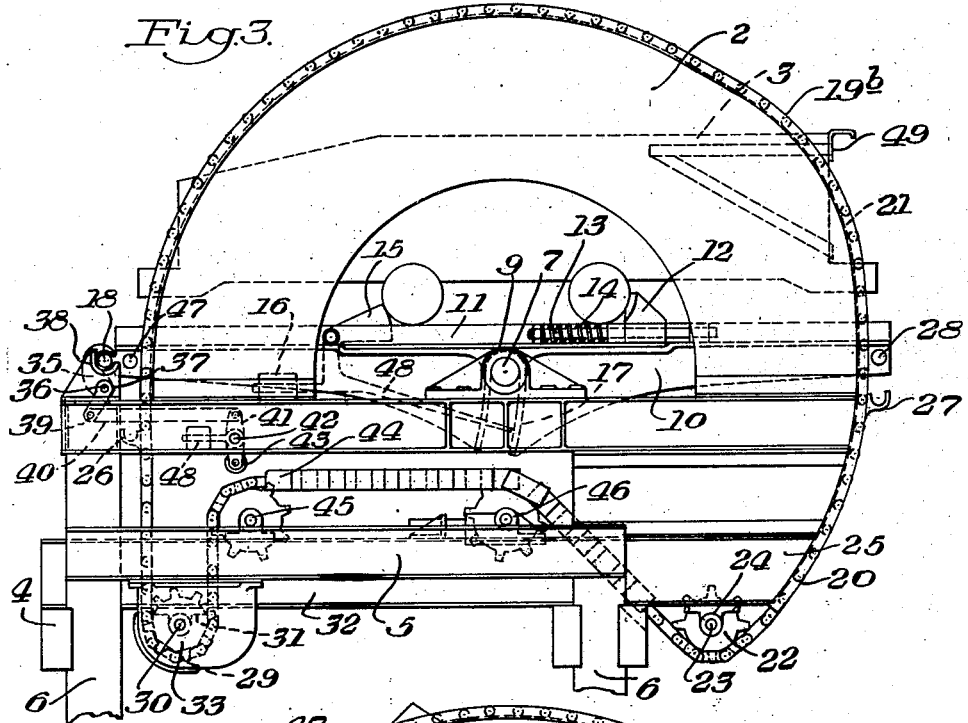
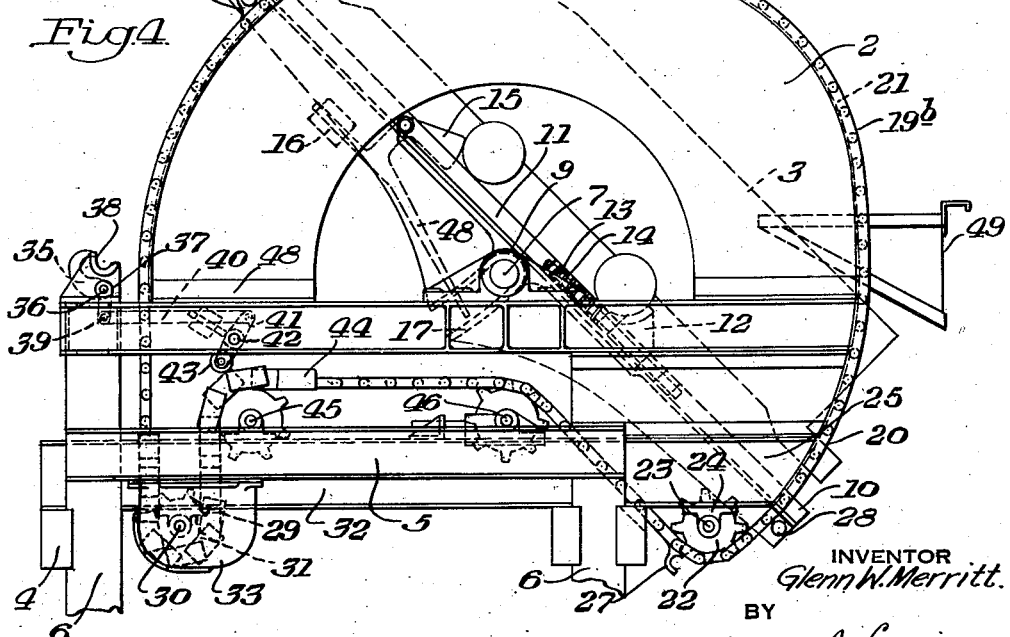
INVENTOR
Glenn W. Merritt.
BY
George J. Croninger
ATTORNEY Dec. 14, 1948.  G. W. MERRITT  2,456,209
CAR DUMPING APPARATUS
Filed Sept. 30, 1944  4 Sheets-Sheet 3
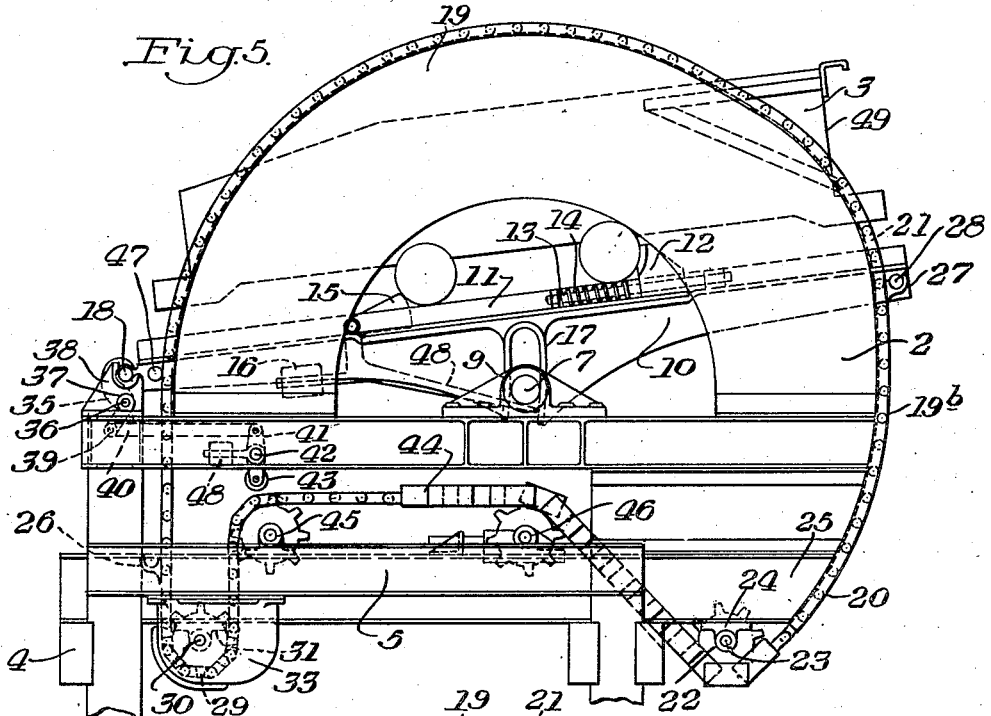
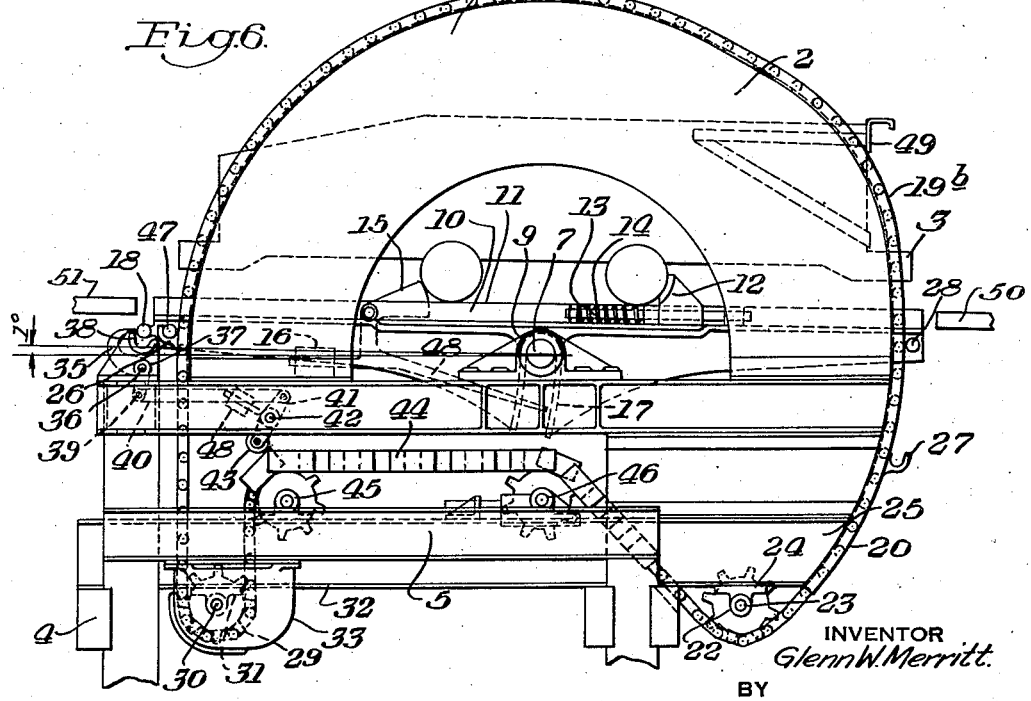
INVENTOR
Glenn W. Merritt
BY
George J. Cromiger
ATTORNEY Dec. 14, 1948. G. W. MERRITT 2,456,209
CAR DUMPING APPARATUS
Filed Sept. 30, 1944 4 Sheets-Sheet 4
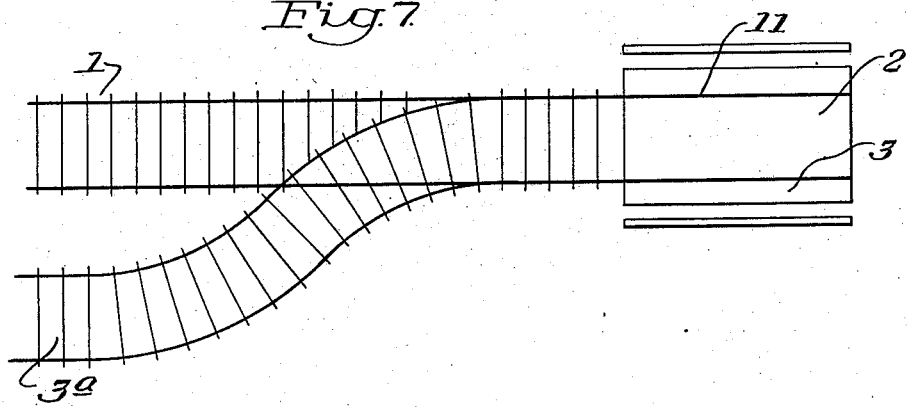
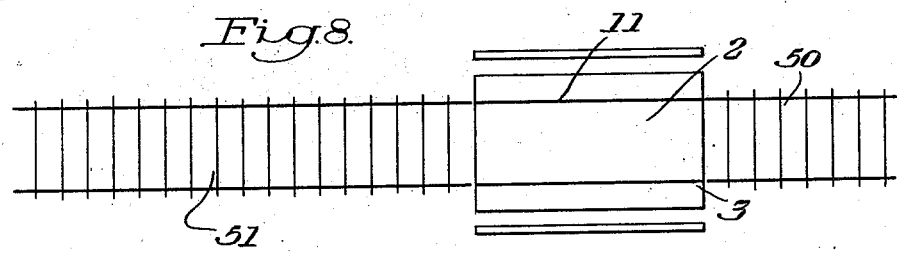
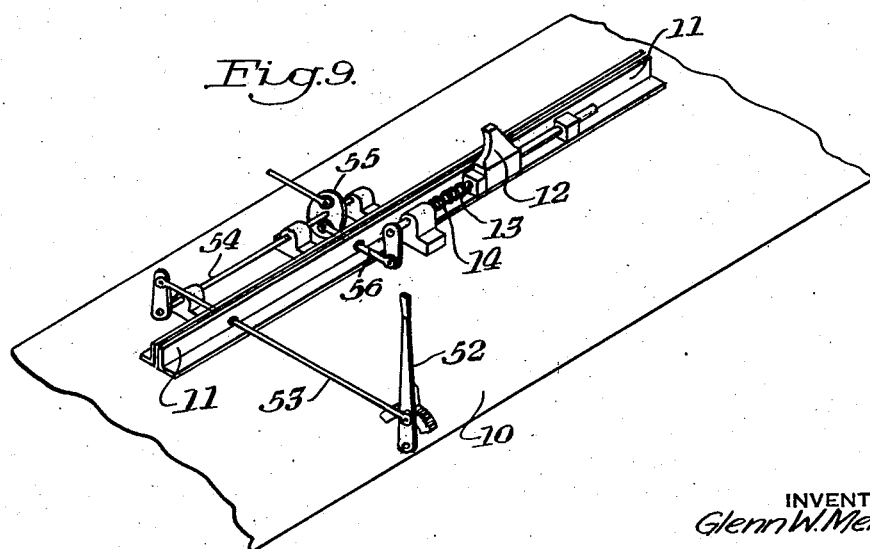
INVENTOR.
Glenn W. Merritt.
BY
George J. Cronninger
ATTORNEY Patented Dec. 14, 1948

2,456,209

UNITED STATES PATENT OFFICE 2,456,209

CAR-DUMPING APPARATUS

Glenn W. Merritt, Bowerston, Ohio, assignor to The Mining Safety Device Company, Bowerston, Ohio, a corporation of Ohio Application September 30, 1944, Serial No. 556,628

17 Claims. (Cl. 214—47)

This invention relates to car dumping apparatus. It has to do with apparatus for dumping mine or railroad cars and is particularly applicable to dumps of the "kick-back" type wherein a loaded car is received upon a platform which is moved to tilted position to incline the car and discharge the contents through one end thereof. Some of the principles of this invention are also applicable to "straight through" type dumps.

The objects of the invention are to provide for positive and reliable control over the tilting of the dump platform; to automatically release the car from the platform subsequent to the dumping operation and to provide a simple, effective and rugged apparatus of the class described requiring a minimum of manual intervention in the operation thereof.

Apparatus constructed in accordance with this invention, broadly comprises a car-receiving platform mounted for pivotal movement about plural axes together with means operable to tilt the platform on one axis and then another to empty the car of its contents and then discharge the car from the dump respectively.

Other objects and advantageous features will be noted in the accompanying drawings and written description, wherein like reference characters designate corresponding parts and wherein:

Figure 1 is a plan view of the preferred form of dumping apparatus.

Figure 2 is an end elevation taken from the left of Figure 1.

Figure 3 is a side elevation of the apparatus of Figure 1.

Figure 4 is a side elevation showing the apparatus in car dumping position.

Figure 5 is a side elevation showing the apparatus in position just prior to releasing the car from the platform.

Figure 6 is a side elevation illustrating how the apparatus would be modified to operate as a "straight through" type dump.

Figure 7 is a diagrammatic view showing a kick-back type dump.

Figure 8 is a diagrammatic view in plan of a straight through type dump.

Figure 9 is a diagram of the horn release mechanism used in conjunction with a straight through type dump.

In Fig. 7, 1 is the approach track leading to the dumping apparatus 2. After the contents of a car 3 have been discharged, the car is removed in the opposite direction from which it entered the dump and is switched to a receiving track 3a.

Dumping apparatus 2, Figures 1 to 5 inclusive, comprises a frame composed of an end lateral 4 and side longitudinals 5 suitably braced to carry the load, said frame being supported on a suitable foundation by verticals 6 at the corners and at intermediate points if required.

Shaft 7 extending laterally of the frame and journaled in oppositely disposed bearings 8 and 9 mounted on longitudinals 5 supports a tiltable platform 10 when said platform is in level horizontal position. Said platform has rails 11 on the upper surface thereof adapted to align with rails 1 in order that the car 3 may roll onto the platform where its momentum is checked by horns 12 on opposite sides of the track. Said horns are of conventional construction and include the customary slide rod 13 and shock-absorbent spring 14.

As a car moves onto the platform, Fig. 1, the wheels depress pivoted, trackside, fan shaped, stop members 15 counterweighted as at 16, Fig. 3 to return them to elevated position behind the rear set of car wheels. These stop members are for the purpose of checking the rebound and preventing the car from rolling off backwards after the lead wheels strike the horns. They are also operable to prevent the car from rolling off backward as the platform is tilted up to a position from which the car may be released and rolled off the dump under its own power as will be later described.

Platform 10 is preferably supported on a centrally disposed cross shaft 7 by a pair of oppositely disposed, elongated, open bottom bearings 17. The elongated parts of these bearings are formed on a radius and the center of curvature thereof is the axis of lateral support bar 18 fixed at the front end of the platform. Thus the platform is balanced so as to facilitate car dumping, however it will be understood that the pivot may be located in an off center position if desired.

On each side of the frame and beyond the platform proper are vertically disposed hoist chain supporting members 19 connected across the top center by brace rod 19a. These members comprise pairs of substantially semi-circular plates bolted or otherwise firmly secured to the lower frame longitudinals 5 and formed with a chain guideway 19b around the perimeter to receive hoist chains 21. Each guideway 19b is extended at the rear end by curved channels 20 in order to guide chains 21 onto a lower set of sprockets 22, Fig. 3, mounted on shaft 23 journaled in inverted bearing 24 attached to lower frame longitudinals 25. Each chain has a pair of upwardly turned hooks 26 and 27 attached thereto, one in front and the other in rear respectively. The front hooks 26 are for the purpose of engaging stub shafts 47 projecting laterally from the front end of the platform and tilting it on the axis of shaft 7, Fig. 1, to car dumping position and the rear set of hooks 27 are for the purpose of engaging a similar set of stub shafts 28 at the rear end of the platform and tilting the platform on the axis of hoist bar 18 to car discharging position. This raises the closed end of bearings 17 off shaft 7 but the curved extensions of the bearings prevent lateral displacement and also prevent disassociation with the shaft 7. The center of curvature of that portion of guideways 19b on which hooks 27 travels is concentric with the axis of shaft 18 when resting in bearings 38. That of hooks 26, shaft 7.

Each chain 21 is driven by a sprocket 29 mounted on a sprocket shaft 30 journaled in bearings 31 attached to lower frame members 32. Said sprocket shaft is driven by a motor 33, Figs. 1 and 2, and the motor speed is controlled by a multiple cam limit switch 33a which governs the amount of travel of the chains in either direction and the speed of travel thereof and changes in the speed of angular travel of the platform during the cycle. It is preferred to initiate the operation of the dump manually and for this purpose a manual starting switch or lever 34 may be provided.

Platform 10 is locked in level loading position by a pair of hooks 35 fixed on lateral shaft 36 mounted in bearings 37 at opposite sides of the frame. These hooks clamp over the bar 18 when the dump is in level position and prevent the dump platform from tilting forward as the car runs thereonto. The hoist bar is received in oppositely disposed open top bearings or rests 38 rigidly attached to the front end of the lower frame in position to support the platform against backward tilting on shaft 7 but acting as a bearing to enable the platform to be tilted upward on shaft 18 to roll the car off the platform.

In order to release the hooks 35, shaft 36 has a depending lever 39 rigidly secured thereto which is connected by a link 40 to a lever 41 that is pivoted at the center on an adjustable support 42 and has a roller 43 mounted on the free end. In order to move lever 41 to hook releasing position, a plurality of segments 44 are attached to one of the chains in a normally horizontal stretch of the chain below the upper frame and between sprocket shafts 45 and 46. These segments strike the roller 43 and push the lever 41 back, as the segments travel over the sprocket, the lead segment striking the lever so as to release the hooks 35 just prior to engagement of the hoisting hooks 26 with stub shafts 47. When the chains are moved in a reverse direction, the counterweight 48 returns lever 41 to normal position as soon as the segments have cleared rollers 43 and the hooks 35 are thereafter clamped on cross bar 18.

To release the car 3 from the platform, each fan shaped stop member 15 is caused to move to wheel releasing position as the platform is tilted on axis 18 by engagement of a projecting lever 48, formed integral therewith, with shaft 7. The car rolls off the inclined platform and is switched onto receiving track 3a.

The end gate 49 of car 3 may be opened in any suitable manner as the platform 10 is tilted. It is customary to do this by means of a stationary rail which runs parallel to the rails and engages a projection on the gate to lift the same as the car is tilted.

To adapt the present structure to what is known as a straight through type dump wherein the car 3 is rolled off the dump platform at the opposite end from which it entered onto a receiving track 50, see Figure 8, substantially the same structure is employed except the hooks 27 are omitted, see Figure 6, and instead of raising the platform on axis 18 to discharge the car, the approach track 51, dump and receiving track 50 are inclined to the horizontal in order that loaded cars may roll onto and empty cars may roll off of the dump by gravity. Any conventional means for holding back filled cars on the approach track whilst a car is being emptied by the dump may be employed to be actuated automatically or manually. To release an empty car from the platform 10, the horns 12 are spread by a manually operated lever 52 mounted on the dump platform 10 at one side of the rails 11, see Figure 9. This lever operates both horns simultaneously by means of a pull rod 53 which is connected to a shaft 54 on which a disc 55 is mounted. Pull rods 56 connected to the disc at diametrically opposed points turn the rods 13 on which the horns are mounted, in their bearings. It will be understood that this operation may, if desired, be performed automatically.

Having thus described my invention what I claim is:

1. Car dumping apparatus comprising a frame, a tiltable support thereon, fixed tracks carried thereby for receiving a car to be dumped, a hoist chain on opposite sides of said support, a hook attached to each chain, trunnions projecting from opposite sides of the support to be engaged by said hooks to tilt said support, a bar attached to said support at one end thereof, rests for receiving said bar when the support is in car-receiving position, locking means for holding the support against tilting, lock releasing means attached to one of said hoist chains arranged to effect the release of the locking means prior to engagement of the hooks with the trunnions and means for moving said chains.

2. Car dumping apparatus comprising a frame, a tiltable support thereon, fixed tracks carried thereby for receiving a car to be dumped, semicircular hoist chain supporting members arranged on opposite sides of said support having chain guideways around the perimeter thereof, a hoist chain disposed in each guideway, an upwardly facing hook attached to each chain, a trunnion projecting from each side of the support to be engaged by hook to tilt the support, locking means operable to hold the support in car receiving position, lock releasing means including an actuator attached to one of said chains arranged to effect the release of the locking means prior to engagement of the hooks with the trunnions and means for moving said chains to cause the support to be tilted and for reversing the movement thereof to return the support to car receiving position and reset the locking means.

3. Car dumping apparatus comprising a frame, a tiltable platform thereon, fixed tracks carried thereby for receiving a car to be dumped, a hoist chain supporting member on opposite sides of said platform, formed with a chain guideway, an endless hoist chain in each guideway, sprockets below the platform for receiving the chain, a motor for driving said chains, a hook attached to each chain, a trunnion projecting from each side of the platform in position to be engaged by said hooks to tilt said platform, a bar across one end of said platform, locking means for holding down said bar to prevent tilting of the platform when in car receiving position, a lever connected to said locking means, and a plurality of members attached to one of said chains operable to engage and move said lever to cause the release of said locking means upon hoisting movement of said chain.

4. Car dumping apparatus comprising a frame, a tiltable support thereon, fixed tracks carried thereby for receiving a car to be dumped, a releasable lock for holding said platform in car receiving position, a pair of endless flexible members supported by the frame, one on one side of the support and the other on the opposite side, means attached to one of said chains for actuating said locking means, means attached to both of said chains for engaging and tilting the support and means for moving said chains.

5. Car dumping apparatus comprising a frame, a horizontally tiltable support thereon, fixed tracks carried thereby for receiving a car to be dumped, a detent for holding said support in car receiving position, a pair of endless flexible members supported by the frame, one on one side of the support and the other on the other side of the support, means operable to actuate the detent attached to one of the flexible members and a support lifting member attached to each flexible member.

6. Car dumping apparatus comprising a frame, a tiltable support thereon, fixed tracks carried thereby for receiving a car to be dumped, a detent for holding said support in car receiving position, a pair of endless flexible members supported by the frame, one on each side of the support, means operable to actuate the detent attached to one of the flexible members, support lifting members attached to each flexible member fore and aft of the platform operable upon movement of the flexible members to tilt the support on one axis and then another axis to empty the contents of a car and discharge the car from the platform respectively and means for moving said flexible members in unison.

7. Car dumping apparatus comprising a frame, a tiltable support thereon, fixed tracks carried thereby for receiving a car to be dumped, a detent for holding said support in car receiving position, a pair of endless flexible members supported by the frame, one on each side of the support, means operable to actuate the detent attached to one of the flexible members, support lifting members attached to each flexible member fore and aft of the platform operable upon movement of the flexible members to tilt the support on one axis and then another axis to empty the contents of a car and discharge the car from the platform respectively, and means for moving said flexible members in unison and means attached to one of said flexible members for actuating said detent.

8. Car dumping apparatus comprising a frame, a tiltable support thereon, fixed tracks carried thereby for receiving a car to be dumped, a detent for holding said support in car receiving position, a pair of endless flexible members supported by the frame, one on each side of the support, means operable to actuate the detent attached to one of the flexible members, support lifting members attached to each flexible member fore and aft of the platform operable upon movement of the flexible members to tilt the support on one axis and then another axis to empty the contents of a car and discharge the car from the platform respectively, means for moving said flexible members in unison, means attached to one of said flexible members for actuating said detent, a car stop and means for releasing the same from car stopping position when the support is tilted about one of said axes.

9. Car dumping apparatus comprising a frame, a tiltable support thereon, fixed tracks carried thereby for receiving a car to be dumped, a detent for holding said support in car receiving position, a pair of endless flexible members supported by the frame, one on each side of the support, means operable to actuate the detent attached to one of the flexible members, support lifting members attached to each flexible member fore and aft of the platform operable upon movement of the flexible members to tilt the support on one axis and then another axis to empty the contents of a car and discharge the car from the platform respectively, means for moving said flexible members in unison comprising a motor and a drive shaft driven thereby, a cam actuated limit switch for controlling the speed of movement of said flexible members and releasible car stop operated upon tilting of the support to move the same to inoperative position.

10. Car dumping apparatus comprising a frame, a tiltable support thereon, fixed tracks carried thereby for receiving a car to be dumped, hoist chain supporting members alongside said support formed with chain receiving guideways, an endless hoist chain in each of said guideways, trunnions attached to said platform fore and aft, hooks attached to said chains engageable with said trunnions to tilt the support about a center axis and an end axis respectively to empty the contents of a car and discharge the car from the support respectively, a detent for holding the platform in car receiving position and means attached to one of said chains for actuating said detent.

11. Car dumping aparatus comprising a frame, a tiltable support thereon, fixed tracks carried thereby for receiving a car to be dumped and a chain hoist formed and positioned for tilting said support on an axis intermediate the ends thereof to empty the contents of a car and on an axis at one of the ends thereof to discharge the car therefrom.

12. Car dumping apparatus comprising a frame, a horizontally disposed support, fixed tracks thereon for receiving a car to be dumped, and a power driven, reversible chain hoist having hooks thereon some of which are formed and positioned for tilting the support on an axis intermediate the ends thereof to discharge the contents of a car and others of which are formed and positioned for lifting one end of the support to cause it to tilt upwardly on an axis at the other end thereof to discharge a car from the support.

13. Car dumping apparatus comprising a frame, a tiltable support thereon, fixed tracks carried thereby for receiving a car to be dumped, a reversible chain lift formed and positioned for tilting said support first on one axis and then another to empty the contents of a car and then discharge the car from the support respectively, a detent for holding the support in car receiving position and means associated with said chain lift for releasing the detent.

14. Car dumping apparatus comprising a frame, a tiltable support thereon, fixed tracks carried thereby for receiving a car to be dumped, a reversible hoist including a flexible member for tilting said support first on one axis and then another to empty the contents of a car and then discharge the car from the support respectively, a detent for holding the support in car receiving position, means for releasing the detent to able the platform to be tilted to car emptying position, and means for holding a car on the support including means operable to release a car for movement therefrom by movement of the support to car discharging position.

15. Car dumping apparatus comprising a frame, a horizontally disposed support arranged to be tilted on a center axis and upon an axis at one of the ends thereof, fixed rails thereon for receiving a car to be emptied, a hoist having elongated flexible members formed and positioned for tilting the support on the center axis to empty the contents of a car and lift the support at one of its ends to tilt it on the other axis and discharge a car therefrom and releasable means for securing a car to the platform whilst the car is being emptied.

16. Car dumping apparatus comprising a frame, a tiltable support thereon, fixed tracks carried thereby for receiving a car to be dumped and a plural-chain hoist whose chain elements are formed and positioned for tilting said support first on one axis and then another to empty the contents of a car and then discharge the car from the support respectively, a detent for holding said support in car receiving position and means operable in response to movement of said flexible means for releasing said detent.

17. Car dumping apparatus comprising a frame, a tiltable support thereon, fixed tracks carried thereby for receiving a car to be dumped and hoisting means for tilting said support first on one axis and then another to empty the contents of a car and then discharge the car from the support respectively, said hoisting means including a flexible member fore and aft of the support having lifting members attached thereto, one of the lifting members being arranged to engage and tilt the support on one axis by movement in a path concentric with said axis and the other of the lifting members being arranged to engage and tilt the support on the other axis by movement in a path concentric with the last named axis.

GLENN W. MERRITT.

REFERENCES CITED

The following references are of record in the file of this patent:

UNITED STATES PATENTS

| Number | Name | Date |
| --- | --- | --- |
| 976,168 | Greene | Nov. 22, 1910 |
| 976,170 | Greene | Nov. 22, 1910 |
| 1,859,501 | Durbin | May 24, 1932 |
| 2,384,904 | Fletcher | Sept. 18, 1945 |